Figure 1:
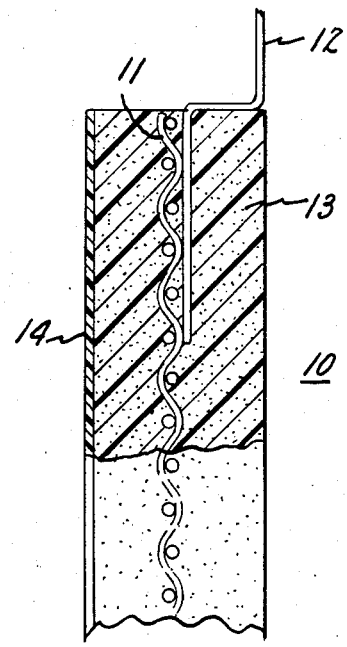

United States Patent [19]
Paynter

[11] 3,793,083
[45] Feb. 19, 1974

[54] METHOD OF FORMING AN ELECTRODE OF MIXED CATALYST POWDERS

[75] Inventor: John Paynter, Burnt Hills, N.Y.

[73] Assignee: General Electric Company, Schenectady, N.Y.

[22] Filed: Dec. 30, 1968

[21] Appl. No.: 787,972

[52] U.S. Cl. .......................................... 136/120 FC
[51] Int. Cl. ............................................ H01m 13/04
[58] Field of Search 136/120 FC, 138, 139; 252/471; 75/108; 23/145

[56] References Cited
UNITED STATES PATENTS

| | | | |
|---|---|---|---|
| 3,310,434 | 3/1967 | Kordesch | 136/120 |
| 1,221,991 | 4/1917 | Holmes | 136/139 |
| 2,192,285 | 5/1940 | Feigl | 252/471 |
| 3,060,254 | 10/1962 | Urry | 136/138 |
| 3,097,974 | 7/1963 | McEvoy et al. | 136/86 |
| 3,248,214 | 4/1966 | Kroeger et al. | 136/120 |
| 3,369,031 | 2/1968 | Becker | 252/471 |

Primary Examiner—L. Dewayne Rutledge
Assistant Examiner—M. J. Andrews
Attorney, Agent, or Firm—Paul R. Webb, II; Joseph T. Cohen; Jerome C. Squillaro

[57] ABSTRACT

A method of forming mixed catalyst powders is described which comprises mixing together a first at least partially soluble metallic salt containing an ion capable of being reduced, a second at least partially soluble metallic salt containing an ion capable of being oxidized, and an aqueous alkaline solution. The ions of the first and second salts are reacted together thereby simultaneously reducing the first ion to a first powder and oxidizing the second ion to a second powder. The first and second powders are precipitated as highly dispersed mixed powders which are then filtered, washed and dried. An electrode is formed from the mixed powders by rolling or pressing the mixed powders against a current collector grid; by adding a dry binder, and pressing and sintering the mixed powders against a current collector; or by adding a liquid-containing binder to the mixed powders to form a paste, and applying the paste onto a current collector and sintering the mixed powders. The electrical conductivity of either the mixed powders or the electrode can be increased by the addition of carbon powder to the mixed powders during or after their preparation.

5 Claims, 2 Drawing Figures

PATENTED FEB 19 1974  3,793,083

Inventor:
John Paynter,
by Paul R. Webb, II
His Attorney.

METHOD OF FORMING AN ELECTRODE OF MIXED CATALYST POWDERS

This invention relates to methods of forming mixed catalyst powders and electrodes employing such powders and, more particularly, to methods of simultaneously forming two chemically different powders to give mixed catalyst powders in which each component of the mixture is highly dispersed in the other, and to electrodes employing such powders.

Such mixed catalyst powders are useful as catalytic materials which may be employed in a wide variety of chemical processes. Such powders can also be used to form electrodes by binding the powder particles together with a suitable, chemically inert binder. Such electrodes are useful as cathodes in various types of cells, such as fuel cells and metal-air cells, employing an alkaline electrolyte. Such electrodes could also be used as anodes. While the mixed powders of my invention may be formed into a number of different types of electrode structures, each electrode should be one which: is electronically conductive, adsorbs the fuel or oxidant employed, will present catalyst materials for the electrode reaction, and will not itself react unduly under the operating conditions of the cell.

My present invention is directed to a new method of forming mixed catalyst powders and to electrodes employing such powders. My method results in an improved electrode which is particularly suitable in an alkaline electrolyte electrochemical cell.

It is a primary object of my invention to provide a new method of forming simultaneously mixed catalyst powders.

It is a further object of my invention to provide a method of forming new and improved electrodes from such mixed powders.

In accordance with one aspect of my invention, a method of forming mixed catalyst powders comprises mixing together a first at least partially soluble metallic salt containing ions capable of being reduced, a second at least partially soluble metallic salt containing ions capable of being oxidized, and an aqueous alkaline solution, reacting the ions of the first and second salts thereby simultaneously reducing the first ions to a first powder and oxidizing the second ions to a second powder, precipitating the first and second powders as highly dispersed mixed powders, and filtering, washing and drying the mixed powders.

Figure 2:
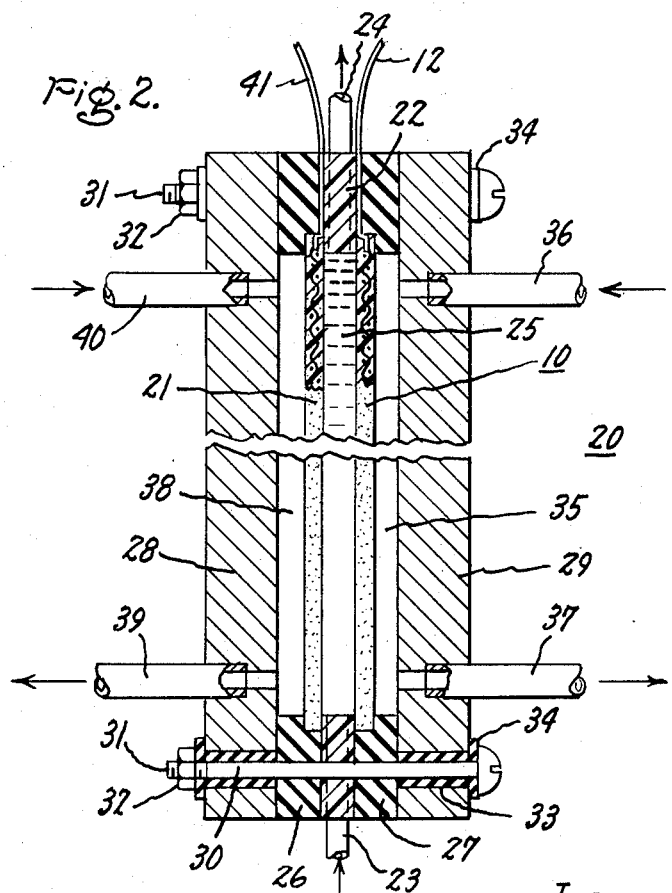

These and various other objects, features and advantages of the invention will be better understood from the following description taken in connection with the accompanying drawing in which:

FIG. 1 is a sectional view of an electrode made from mixed catalyst powders in accordance with the method of my invention; and FIG. 2 is a sectional view of a fuel cell employing an electrode of FIG. 1 as its gas diffusion cathode electrode.

In FIG. 1 of the drawing, there is shown generally an electrode 10 made in accordance with the method of my invention which has a terminal grid in the form of a metal wire screen 11 which serves the functions of transmitting electrical current and providing reinforcement for the electrode. An electrical connection in the form of an electrical lead 12 is connected directly to screen 11. Electrode 10 has at 13 mixed catalyst powders held together by a binder and in electronically conductive relation with wire screen 11. For example, the catalyst is held together and bonded to screen 11 by a binder material of polytetrafluoroethylene (PTFE). Electrode material 13 surrounds both the screen 11 and a portion of electrical lead 12. The ration of such a binder to the mixed catalyst powders may be from about 5 to 50 percent by weight, with the preferred range being from about 10 to 30 percent by weight. If desired, a hydrophobic film 14 is shown bonded to one surface of electrode material 13 to prevent electrolyte drowning of electrode 10. This film is desirable if the electrode is to be used with a free aqueous electrolyte.

In FIG. 2 of the drawing, there is shown generally at 20 an electrochemical cell in the form of a fuel cell embodying our invention which comprises gas diffusion cathode 10 from FIG. 1 of the drawing and an anode 21, separated by an annular electrolyte gasket 22. Electrolyte inlet conduit 23 and electrolyte outlet conduit 24 are sealingly related to the electrolyte gasket to circulate a free aqueous electrolyte to and from electrolyte chamber 25 formed by the anode, cathode and gasket. An anode gasket 26 and a cathode gasket 27 are positioned adjacent opposite faces of the electrolyte gasket to seal therewith and to hold the anode and cathode in assembled relation. Identical end plates 28 and 29 are associated with the anode and cathode gaskets, respectively, in sealing relation therewith. To hold the gaskets and end plates in assembled relation a plurality of tie bolts 30 are provided, each having a threaded end 31 and a nut 32 mounted thereon. To insure against any possibility of internal short circuiting of the fuel cell electrodes, the tie bolts are provided with insulative bushings 33 within each end plate and with an insulative washer 34 adjacent each terminus.

An oxidant chamber 35 is formed by the cathode gasket, cathode, and end plate 29. An oxidant inlet conduit 36 is sealingly associated with the end plate to allow oxidant to be fed to the oxidant chamber while an oxidant outlet conduit 37 is similarly associated with the end plate to allow the purge of oxidant. Where the fuel cell is to be operated on ambient air, no end plate 29 is required. The anode, anode gasket, and end plate 28 similarly cooperate to form a fuel chamber 38. A fuel outlet conduit 39, similar to oxidant outlet conduit 47, is provided. A fuel inlet conduit 40 is shown for providing a fuel to the fuel chamber. An electrical lead 41 is provided for anode 21. Such a fuel cell operates generally on a gaseous fuel.

I discovered unexpectedly that I could form inexpensive mixed catalyst powders by mixing together a first at least partially soluble metallic salt containing ions capable of being reduced, a second at least partially soluble metallic salt containing ions capable of being oxidized, and an aqueous alkaline solution. There is a mutual oxidation-reduction under certain conditions wherein the ions of the first and second salts react thereby simultaneously reducing the first ions to a first powder and oxidizing the second ions to a second powder. The powders precipitate uniquely as highly dispersed mixed catalyst powders which are then filtered, washed and dried. This simultaneous oxidation-reduction with the formation of powders occurs in the presence of excess base in the form of the aqueous alkaline solution. Such a reaction utilizes suitable aqueous alkaline solutions such as potassium hydroxide, sodium hydroxide, ammonium hydroxide, etc.

Ions capable of being reduced, the oxidant, and ions capable of being oxidized, the reductant, will react together simultaneously under certain conditions whereby the ions capable of being reduced will oxidize the ions capable of being oxidized, and the ions capable of being oxidized will reduce the ions capable of being reduced. For this simultaneous oxidation-reduction to occur, the potential of the oxidation-reduction couple for the oxidant and its reduced form must be more negative than that for the reductant and its oxidized form.

Reference is made on pages 345–348 of "Oxidation Potentials" by Wendell M. Latimer which was published by Prentice-Hall, Inc., Second Edition, 1952, which pages are incorporated herein by reference. On pages 345–348 under the heading "Table 85" there is set forth the standard "Oxidation-Reduction Couples In Basic Solutions." Ions capable of being reduced will react with ions capable of being oxidized, when the ions capable of being reduced appear on the right-hand side of couples with more negative potentials in the above table than those of couples in which the ions capable of being oxidized appear on the left-hand side. Accordingly, when the present application refers to ions capable of being reduced, and to ions capable of being oxidized, and to such ions reacting simultaneously in an alkaline solution, these terms include this necessary relationship of these ions.

If silver nitrate containing $Ag^+$ ions capable of being reduced and manganese nitrate containing $Mn^{++}$ ions capable of being oxidized are mixed with an aqueous solution of potassium hydroxide, the oxidation-reduction reaction between the silver ions and manganous ions may be represented as follows:

$$2Ag^+ + Mn^{++} + 4OH^- \rightarrow 2Ag + MnO_2 + 2H_2O \quad (1)$$

In the aqueous alkaline solution, the silver ions are reduced to metallic silver powder by the manganous ions while the manganous ions are simultaneously oxidized to an insoluble manganese dioxide powder by the silver ions. Both powders are precipitated following the above reaction as highly dispersed mixed catalyst powders. The precipitate is recovered, for example, by conventional filtering techniques, after which the precipitate is dried.

When I use silver ions as the ions capable of reduction, that is as the oxidant, silver nitrate is the preferred soluble silver salt. For other ions, any sufficiently soluble salt will do.

Several additional reactions between ions capable of being reduced and ions capable of being oxidized and leading to the formation of solid products may be represented as follows:

$$Ag^+ + Co^{++} + 3OH^- \rightarrow Ag + Co(OH)_3 \quad (2)$$

$$Ag^+ + Fe^{++} + 3OH^- \rightarrow Ag + Fe(OH)_3 \quad (3)$$

$$2Ag^+ + Tl^+ + 3OH^- \rightarrow 2Ag + Tl(OH)_3 \quad (4)$$

$$2Ag^+ + Sn^{++} + 4OH^- \rightarrow 2Ag + SnO_2 + 2H_2O \quad (5)$$

$$2MnO^- + 6Ni^{++} + 10(OH^-) \rightarrow 2MnO_2 + 3Ni_2O_3 + 5H_2O \quad (6)$$

$$MnO_4^- + 3Co^{++} + 5OH^- + 2H_2O \rightarrow MnO_2 + 3Co(OH)_3 \quad (7)$$

In the above formulae, the oxygen containing products are written as hydroxides or oxides for simplicity, while in most reactions hydrous oxides of variable water content are formed initially or upon drying the products at a temperature preferably below 200°C. The mixed catalyst powders are obtained as finely divided brown to black powders possessing high specific surface area of 10 to 40 m²/g.

I found that the electrical conductivity of the mixed powder can be increased by adding finely divided, electrically conductive powder to the mixed powders. This addition can be made by adding the conductive powder to the appropriate solutions prior to or subsequent to the precipitation of the catalyst powder, or to the dried powder after its formation. Suitable finely divided powders, which are electrically conductive for employment with the mixed powders include finely divided powders of carbon, carbon with boron dissolved therein, and mixtures of carbon with boron dissolved therein and boron carbide.

While the above high surface area, mixed catalyst powders can be formed into an electrode without a binder, I prefer to employ a binder to hold the powders together and to a current collector, or on a porous, electrically conductive substrate. Such an electrode can be constructed without a binder, for example, by rolling or pressing the powders against the current collector grid. The powders can also be compacted and pressed together to form a plate or layer which is then pressed against the current collector grid. The powders can also be filtered through a porous substrate to form an electrode.

Current collectors which require material of good electrical conductivity, can be provided in various configurations such as screens, metal wires, metal bars, punched metal plate, expanded metal plate, porous metal sheet, etc. Suitable substrates include porous carbons, nickel plaques, etc. The binder may be any adhesive material that is not chemically attacked by the electrolyte or the reactant fluid of the cell in which the electrode is to be used. Various binders meeting this criteria are known to the art. Preferred binders are hydrophobic halocarbons, most preferably fluorocarbon binders, having a critical surface tension less than the surface tension of water. Perfluorinated polymers such as polytetrafluoroethylene (PTFE) and polyhexafluoropropylene possess the highest degree of hydrophobicity and chemical stability of presently known binders and are accordingly preferred.

I found that the electrodes made in accordance with my method can be employed as cathodes or anodes in various electrochemical cells in which an alkaline electrolyte is used. Various anodes can also be incorporated in these cells such as a standard platinum black electrode, which has 34 milligrams of platinum per square centimeter bonded with polytetrafluoroethylene as in the same manner of preparation as used for the electrodes of my invention.

Various alkaline electrolytes can be employed in an electrochemical cell which incorporates my improved electrode as the cathode. Suitable alkaline electrolytes include potassium hydroxide, sodium hydroxide, etc.

In an illustrative formation of mixed catalyst powders and an electrode employing such powders made in accordance with my method, an aqueous solution was prepared of silver nitrate and manganese nitrate. The solution was stirred and heated to approximately 80°C. Ammonia was added to the solution thereby causing the $Ag^+$ ions and $Mn^{++}$ ions to react and form metallic silver and manganese dioxide which precipitated from the solution. The mixed catalyst powders were filtered from the solution by conventional vacuum filtration. The mixed catalyst powders were then dried at a temperature of about 125°C to form the mixed catalyst powders of my invention.

An electrode was formed from the above mixed catalyst powders by adding thereto a polytetrafluoroethylene suspension. A paste, formed in this manner, was mixed thoroughly and then spread on a weighed platinum screen so that the paste extended into and through the screen mesh openings. A platinum tab for electrical connection extended from the screen. The electrode was dried slowly on a hot plate in argon and then cured at 350°C. The electrode was weighed to determine the total weight of the catalyst. The electrode was then waterproofed on one side by applying a hydrophobic Teflon film on one surface. The electrode was then pressed at an elevated temperature. Such an electrode made in accordance with the method of my invention is shown in FIG. 1 of the drawing.

The above electrode was then employed as a cathode in an electrochemical cell in the form of a fuel cell as shown in FIG. 2 of the drawing while a standard platinum black electrode, which has 34 milligrams of platinum per square centimeter bonded with PTFE was employed as the anode. The cell was operated with oxygen gas to the cathode and hydrogen fuel to the anode. 27 percent KOH was used as the electrolyte and the cell was operated at a temperature of 25°C. This cell operated quite satisfactorily Examples of mixed catalyst powders and electrodes made in accordance with the method of my invention are set forth below:

EXAMPLES 1–4

In each of these Examples 1–4 a solution was prepared by mixing together 3.03M silver nitrate solution and 2.86M manganese nitrate solution. 10 milliliters of silver nitrate solution was employed in each example while 10 milliliters of manganese nitrate solution was used in Examples 1 and 2 and 5.3 milliliters of manganese nitrate was used in Examples 3 and 4. Additionally, 4.58 grams of carbon powder was added to the solutions of Examples 3 and 4, and 10 milliliters of water was added to the solutions of Examples 1 and 2. Each solution or mixture was stirred and heated to approximately 80°C. Ten milliliters of 15M ammonia was added to the solutions of Examples 1 and 2 while 10.5 milliliters of 27 weight percent potassium hydroxide was added to the solutions of Examples 3 and 4. Upon the addition of the ammonia or the potassium hydroxide to the respective solutions, a mutual oxidation-reduction occurred wherein the silver ions oxidized the manganese ions causing formation of the solid product of manganese dioxide and the manganese ions reduced the silver ions simultaneously to the solid product of metallic silver. These solid products precipitated as highly dispersed mixed catalyst powders.

The resulting mixed powders from each of the above Examples were recovered by conventional vacuum filtration of the solution with the precipitate therein. Each precipitate was washed with water and dried at 120°C for 1 ¾ hours. The mixed powders of Example 2 had 50 weight percent carbon powder mixed therein to provide the final mixed catalyst powders. The highly dispersed mixed catalyst powders of Examples 1–4 were ground and sieved through a 325 mesh screen.

EXAMPLE 5

In this example, a solution was prepared by dissolving 3.1 grams of cobaltous nitrate in 100 milliliters of water. Nine M potassium hydroxide was added until the solution was basic. The mixture was stirred and heated to approximately 80°C. There was then added to the solution 0.02M potassium permanganate whereupon a mutual oxidation-reduction occurred in which the permanganate ions oxidized the cobaltous ions causing formation of the solid product of cobaltic hydroxide and the cobaltous ions reduced the permanganate ions simultaneously to the solid product of manganese dioxide. The addition of potassium permanganate was continued until a pink color persisted in the solution. These solid products precipitated as highly dispersed mixed catalyst powders.

The resulting mixed powders were recovered by conventional vacuum filtration of the solution with the precipitate therein. The precipitate was washed with water and dried at 125°C for 1 hour. The mixed powders had 50 weight percent carbon powder mixed therein to provide the final mixed catalyst powders. The highly dispersed mixed catalyst powders were ground and sieved through a 325 mesh screen.

EXAMPLES 6–7

In each of these Examples 6–7 mixtures were prepared of 5 grams of carbon powder and 12.03 grams of cobaltous nitrate which were then added to 58 milliliters of 0.40M potassium permanganate and to 14 milliliters of water, respectively. The mixture of Example 6 was stirred while the mixture of Example 7 was stirred at room temperature and heated to approximately 80°C. Twenty-seven weight percent potassium hydroxide was added to each of the solutions until basic. Approximately 15.5 milliliters of KOH was added in Example 6 while approximately 14.0 milliliters of KOH was added in Example 7. To the mixture of Example 7 was added 45 milliliters of 0.40M potassium permanganate. Upon the addition of KOH in Example 6, and upon the addition of $KMnO_4$ in Example 7, a mutual oxidation-reduction occurred in each example wherein the permanganate ions oxidized the cobaltous ions causing formation of the solid product of cobaltic hydroxide and the cobaltous ions reduced the permanganate ions simultaneously to the solid product of manganese dioxide. These solid products precipitated as highly dispersed mixed catalyst powders.

The resulting mixed powders from each of the above examples were recovered by conventional vacuum filtration of the solution with the precipitate therein. The precipitates were washed with water and dried at 120°C for three hours and one hour, respectively. The highly dispersed mixed catalyst powders of Examples 6–7 were ground and sieved through a 325 mesh screen.

EXAMPLE 8

In this example, 20 milliliters of 27 weight percent potassium hydroxide was added to 50 milliliters of 1.20M nickel nitrate solution. The mixture was stirred and heated to approximately 80°C. To the mixture was added 50 milliliters of 0.40M potassium permanganate with additional KOH to keep the solution basic, whereupon a mutual oxidation reduction occurred in which the permanganate ions oxidized the nickel ions causing formation of the solid product of nickelic oxide and the nickel ions reduced the permanganate ions simultaneously to the solid product of manganese dioxide. These solid products precipitated as highly dispersed mixed catalyst powders.

The resulting mixed powders from this example were recovered by conventional vacuum filtration of the solution with the precipitate therein. The precipitate was washed with water and dried at 125°C for 2 ¼hours. The mixed powders had 50 weight percent carbon powder mixed therein to provide the final mixed catalyst powders. The highly dispersed mixed catalyst powders were ground and sieved through a 325 mesh screen.

EXAMPLE 9

In this example, 5.0 grams of carbon powder, 13.02 grams of nickel nitrate, and 37 milliliters of 0.40M potassium permanganate were mixed together. The solution was stirred and heated to approximately 80°C. Approximately 13.0 milliliters of 27 weight percent potassium hydroxide was added to the mixture whereupon a mutual oxidation-reduction occurred wherein the permanganate ions oxidized the nickel ions causing formation of the solid product of nickelic oxide and the nickel ions reduced the permanganate ions simultaneously to the solid product of manganese dioxide. These solid products precipitated as highly dispersed mixed catalyst powders.

The resulting mixed powders from this example were recovered by conventional vacuum filtration of the solution with the precipitate therein. The precipitate was washed with water and dried at 120°C for 3 ½hours. The highly dispersed mixed catalyst powders were ground and sieved through a 325 mesh screen.

EXAMPLE 10

In this example, a solution was prepared by adding 17.62 grams of cobaltous nitrate to 100 milliliters of water. Fifty milliliters of 9M potassium hydroxide was added to the solution. The mixture was stirred and heated to approximately 80°C. Twenty milliliters of 3.03M silver nitrate was added to the mixture whereupon a mutual oxidation-reduction occurred wherein the silver ions oxidized the cobaltous ions causing formation of the solid product of cobaltic hydroxide and the cobaltous ions reduced the silver ions simultaneously to the solid product of metallic silver. These solid products precipitated as highly dispersed mixed catalyst powders.

The resulting mixed powders from this example were recovered by conventional vacuum filtration of the solution with the precipitate therein. The precipitate was washed with water and dried at 115°C for 2 hours. The mixed powders had 50 weight percent carbon powder mixed therein to provide the final mixed catalyst powders. The highly dispersed mixed catalyst powders were ground and sieved through a 325 mesh screen.

EXAMPLES 11–12

In each of these Examples 11–12, a solution was prepared by adding 5.0 grams of carbon powder to 8.25 milliliters of 3.03M silver nitrate. To this solution was added 7.28 grams of cobaltous nitrate and 25 milliliters of water. Each solution was stirred and heated to approximately 80°C. Approximately 13.5 milliliters of 27 weight percent potassium hydroxide was added to the solutions of Examples 11 and 12, whereupon a mutual oxidation-reduction occurred in which the silver ions oxidized the cobaltous ions causing formation of the solid product of cobaltic hydroxide and the cobaltous ions reduced the silver ions simultaneously to the solid product of metallic silver. Additional water was added to maintain a thin paste consistency. These solid products precipitated as highly dispersed mixed catalyst powders.

The resulting mixed powders from each of the above examples were recovered by conventional vacuum filtration of the solution with the precipitate therein. Each precipitate was washed with water and dried at 120°C for 3 hours. The highly dispersed mixed catalyst powders of Examples 11–12 were ground and sieved through a 325 mesh screen.

EXAMPLE 13

In this example, a solution was prepared of 5.0 milliliters of 3.03M silver nitrate solution and of 1.0 milliliter of concentrated sulfuric acid. The solution was evaporated to dryness. Fifty milliliters of water and 10 milliliters of concentrated ammonia were added to the residue to provide a solution. The solution was stirred and heated to approximately 80°C. To the solution was added 100 milliliters of 0.10M ammonium ferrosulfate whereupon a mutual oxidation-reduction occurred wherein the silver ions oxidized the ferrosulfate ions causing formation of the solid product of ferric oxide and the ferrosulfate ions reduced the silver ions simultaneously to the solid product of metallic silver. These solid products precipitated as highly dispersed mixed catalyst powders.

The resulting mixed powders from this example were recovered by conventional vacuum filtration of the solution with the precipitate therein. The precipitate was washed with water and dried at 180°C for 1 ½hours. The mixed powders had 50 weight percent carbon powder mixed therein to provide the final mixed catalyst powders. The highly dispersed mixed catalyst powders were ground and sieved through a 325 mesh screen.

EXAMPLE 14

In this example, a solution was prepared by adding 9.20 grams of thallous nitrate to 300 milliliters of water. 45 milliliters of 27 weight percent potassium hydroxide were added to the solution which was stirred at room temperature. A second solution was prepared of 15.3 grams of silver nitrate in 50 milliliters of water which was added to the first solution whereupon a mutual oxidation-reduction occurred in which the silver ions oxidized the thallous ions causing formation of the solid product of thallic hydroxide and the thallous ions reduced the silver ions simultaneously to the solid product of metallic silver. These solid products precipitated as highly dispersed mixed catalyst powders.

The resulting mixed powders from this example were recovered by conventional vacuum filtration of the solution with the precipitate therein. The precipitate was washed with dilute ammonia and then with water and dried at 115°C for 2 hours. The mixed powders had 50 weight percent carbon powder mixed therein to provide the final mixed catalyst powders. The highly dispersed mixed catalyst powders were ground and sieved through a 325 mesh screen.

EXAMPLES 15–23

Each of the mixed catalyst powders from Examples 1, 3, 4, 5, 8, 10, 12, 13 and 14 was formed into a separate electrode by mixing the powders with a sufficient amount of a polytetrafluoroethylene suspension to give a paste which when dried contained 15 weight percent binder. Each paste, formed in this manner, was mixed thoroughly and then spread on a 1 7/8 inch diameter weighed platinum screen which was 45 × 45 mesh and had a wire diameter of 0.0078 inch so that the paste extended into and through the screen mesh openings. A platinum tab is attached for electrical connection. Each electrode was then dried slowly on a hot plate in argon and then cured at 350°C. Each electrode was weighed to determine the total weight of the catalyst. Each electrode was then waterproofed on one side by applying a hydrophobic Teflon film on one surface so as to give approximately 0.4 milligram Teflon film per square centimeter of electrode surface. Each electrode was pressed and sintered.

EXAMPLES 24–28

Each of the mixed powders from Examples 2, 6, 7, 9 and 11 was formed into a separate electrode by dry blending the mixed powders and a polytetrafluoroethylene powder to give a mixture containing 15 weight percent binder. The mixture was then applied and the electrode formed in the same manner as described above in Examples 15–23.

EXAMPLES 29–42

The electrodes from Examples 15–28 were each employed as a cathode in an electrochemical cell which had a platinum electrode as the anode. The anode contained 34 milligrams of platinum per square centimeter bonded with PTFE as described above for the formation of the cathodes of our invention. The cell was operated with oxygen gas supplied to the cathode and a hydrogen fuel gas supplied to the anode.

The above electrochemical cell was provided with an electrolyte of 27% KOH and operated at a temperature of 25°C. The performance of these cells is set forth below in Table I as cells 1–14 in which cathodes 15–28 are employed, respectively, and wherein the cathode electrode potential versus a hydrogen reference in volts is plotted against current density in milliamperes per square centimeter.

TABLE I

| Cell No. | Current Density ma/cm² | | | | |
|---|---|---|---|---|---|
|  | 1 | 10 | 40 | 80 | 160 |
| 1 | 979 | 942 | 900 | 857 | 782 |
| 2 | 959 | 909 | 859 | 815 | 758 |
| 3 | 954 | 913 | 871 | 834 | 782 |
| 4 | 956 | 915 | 878 | 845 | 800 |
| 5 | 966 | 909 | 835 | 775 | 702 |
| 6 | 963 | 902 | 839 | 802 | 760 |
| 7 | 970 | 923 | 871 | 840 | 807 |
| 8 | 912 | 861 | 823 | 799 | 770 |

TABLE I-Continued

| Cell No. | Current Density ma/cm² | | | | |
|---|---|---|---|---|---|
|  | 1 | 10 | 40 | 80 | 160 |
| 9 | 937 | 889 | 847 | 819 | 787 |
| 10 | 935 | 874 | 803 | 752 | 679 |
| 11 | 951 | 890 | 834 | 790 | 734 |
| 12 | 947 | 890 | 823 | 769 | 701 |
| 13 | 900 | 838 | 786 | 744 | 681 |
| 14 | 924 | 878 | 826 | 780 | 689 |

The catalyst loading of each of the electrodes from Examples 15–28 is set forth below in Table II. Each loading, which is in milligrams per square centimeter, consists of the catalyst without binder or carbon additive.

TABLE II

| Example No. | Catalyst Loading |
|---|---|
| 15 | 103 |
| 16 | 27 |
| 17 | 38 |
| 18 | 19 |
| 19 | 20 |
| 20 | 21 |
| 21 | 30 |
| 22 | 22 |
| 23 | 19 |
| 24 | 21 |
| 25 | 18 |
| 26 | 22 |
| 27 | 19 |
| 28 | 25 |

EXAMPLES 43–44

The electrodes from Examples 25 and 27 were each employed as an anode in an electrochemical cell which had a platinum electrode as the cathode. The cathode contained 34 milligrams of platinum per square centimeter bonded with PTFE as described above for the formation of the electrodes of my invention. The cell was operated with oxygen gas supplied to the cathode and 85 percent hydrazine hydrate fuel supplied to the anode.

The above electrochemical cell was provided with an electrolyte of 27% KOH and operated at a temperature of 25°C. The performance of these cells is set forth below in Table III as cells 15 and 16 in which electrodes 25 and 27 are employed, respectively, and wherein the anode electrode potential versus a hydrogen reference in volts is plotted against current density in milliamperes per square centimeter.

TABLE III

| Cell No. | Current Density ma/cm² | | | | |
|---|---|---|---|---|---|
|  | 1 | 10 | 40 | 80 | 160 |
| 15 | -139 | -124 | -90 | -53 | -10 |
| 16 |  |  |  |  |  |
| 78 |  |  |  |  |  |
| 50 |  |  |  |  |  |
| 19 | +8 | +168 |  |  |  |

While other modifications of the invention and variations thereof which may be employed within the scope of this invention have not been described, the invention

What I claim as new and desire to secure by Letters Patent of the United States is:

1. A method of forming an electrode comprising forming a first aqueous solution by mixing together a first at least partially soluble metallic salt containing ions capable of being reduced, a second at least partially soluble metallic salt containing ions capable of being oxidized, adding to the first aqueous solution a second aqueous alkaline solution thereby forming a third solution, reacting the ions of the first and second salts thereby simultaneously reducing the ions of the first salt to a first powder, oxidizing the ions of the second salt to a second different powder, and precipitating the first and second powders as highly dispersed mixed catalyst powders in the third solution, filtering, washing and drying the mixed catalyst powders, and forming the mixed catalyst powders into an electrode.

2. A method as in claim 1, in which a finely divided, electrically conductive powder is added to the third solution.

3. A method as in claim 1, in which a finely divided, electrically conductive powder is added to the dried mixed powders.

4. A method as in claim 1, in which a chemically inert binder holds the mixed powders together.

5. A method as in claim 1, in which the ions capable of being reduced are $MnO_4^-$.

UNITED STATES PATENT OFFICE
CERTIFICATE OF CORRECTION

Patent No. 3,793,083      Dated Feb. 19, 1974

Inventor(s) John Paynter

It is certified that error appears in the above-identified patent and that said Letters Patent are hereby corrected as shown below:

Column 9, line 53, cancel "volts" and substitute --millivolts--

Column 10, line 51, cancel "volts" and substitute --millivolts--

Column 10, line 54, cancel Table III and substitute therefor the following Table III:

TABLE III

| Cell No. | Current Density ma/cm$^2$ | | | | |
|---|---|---|---|---|---|
| | 1 | 10 | 40 | 80 | 160 |
| 15 | -139 | -124 | -90 | -53 | -10 |
| 16 | -78 | -50 | -19 | +8 | +168 |

Signed and sealed this 29th day of October 1974.

(SEAL)
Attest:

McCOY M. GIBSON JR.
Attesting Officer

C. MARSHALL DANN
Commissioner of Patents